(12) United States Patent
Kratschmer et al.

(10) Patent No.: US 7,478,000 B2
(45) Date of Patent: *Jan. 13, 2009

(54) METHOD AND SYSTEM TO DEVELOP A PROCESS IMPROVEMENT METHODOLOGY

(75) Inventors: Theresa C. Kratschmer, Yorktown Heights, NY (US); Peter Kenneth Malkin, Ardsley, NY (US); Pradmanabhan Santhanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/869,850

(22) Filed: Oct. 10, 2007

(65) Prior Publication Data

US 2008/0033686 A1    Feb. 7, 2008

Related U.S. Application Data

(63) Continuation of application No. 11/397,034, filed on Apr. 3, 2006.

(51) Int. Cl.
*G06F 19/00* (2006.01)

(52) U.S. Cl. ............ 702/83; 702/81; 702/182; 702/123; 717/101

(58) Field of Classification Search .......... 702/83, 702/182, 183, 81, 123; 707/7; 706/46, 59; 717/101
See application file for complete search history.

(56) References Cited

U.S. PATENT DOCUMENTS

| | | | | |
|---|---|---|---|---|
| 4,866,635 A | * | 9/1989 | Kahn et al. | 706/46 |
| 2005/0114829 A1 | * | 5/2005 | Robin et al. | 717/101 |
| 2007/0067293 A1 | * | 3/2007 | Yu | 707/7 |

* cited by examiner

*Primary Examiner*—John E. Barlow, Jr.
*Assistant Examiner*—Hien X Vo
(74) *Attorney, Agent, or Firm*—Michael J. Buchenhorner; Vazken Alexanian

(57) ABSTRACT

A method to create an instance of a defect-based production and testing process analysis machine (DPTPAM) provides continual process improvement based on foundational questions and classified defect data. The method includes the following steps: obtaining domain specific questions; developing a domain specific classification scheme that supports the answering of the foundational and domain specific questions; determining a method of using the domain specific classification scheme to answer both the foundational and domain specific questions; and creating a domain specific DPTPAM instance embodying the domain specific classification scheme and the method of answering the foundational and domain specific questions. The method can be implemented with a machine and a computer readable medium comprising logic for performing the method.

4 Claims, 12 Drawing Sheets

Logic Flow of Instance of Defect-Based Production and Testing Process Analysis Machine, DPTPAM

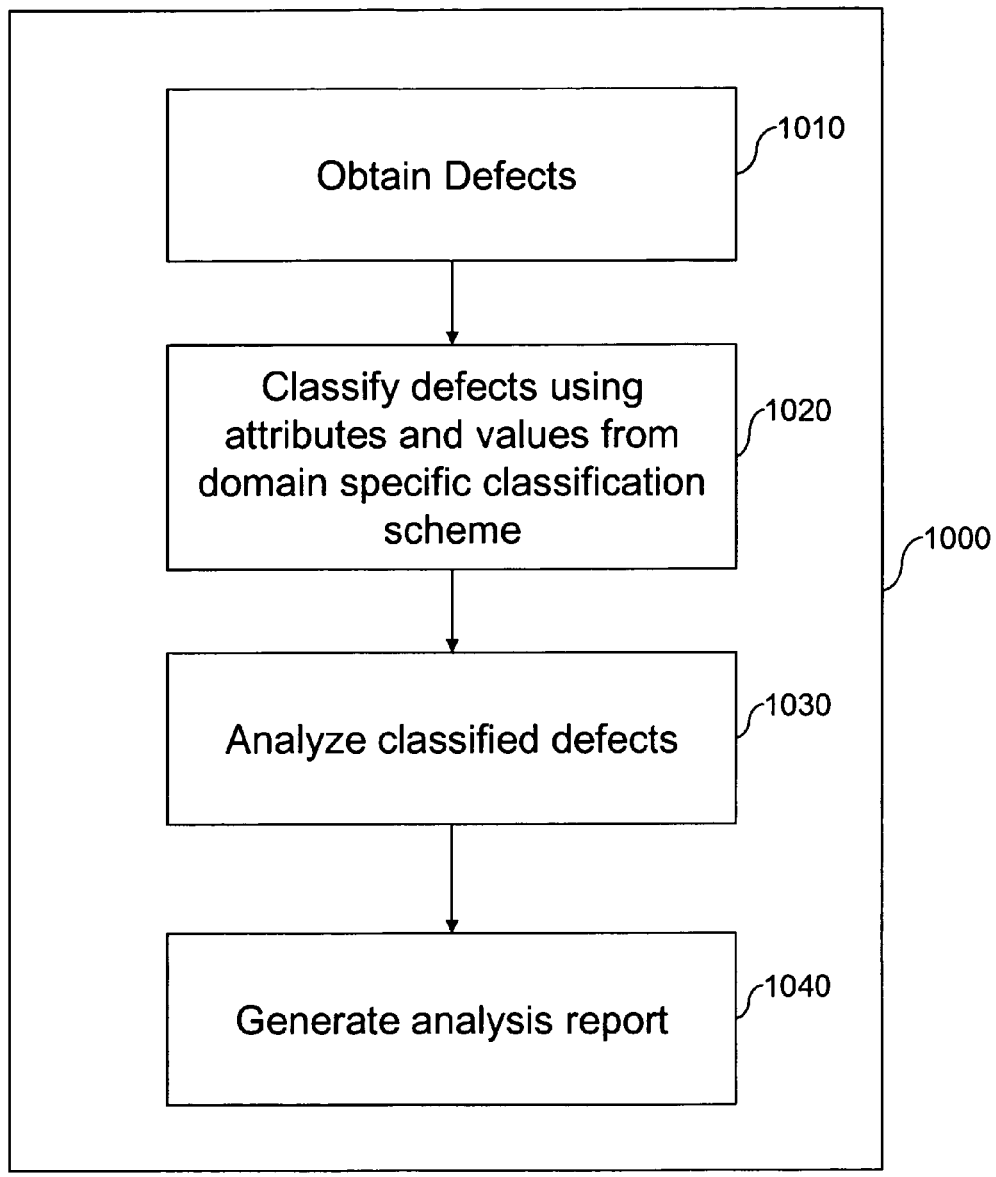
Fig. 1 – Logic Flow of Instance of Defect-Based Production and Testing Process Analysis Machine, DPTPAM

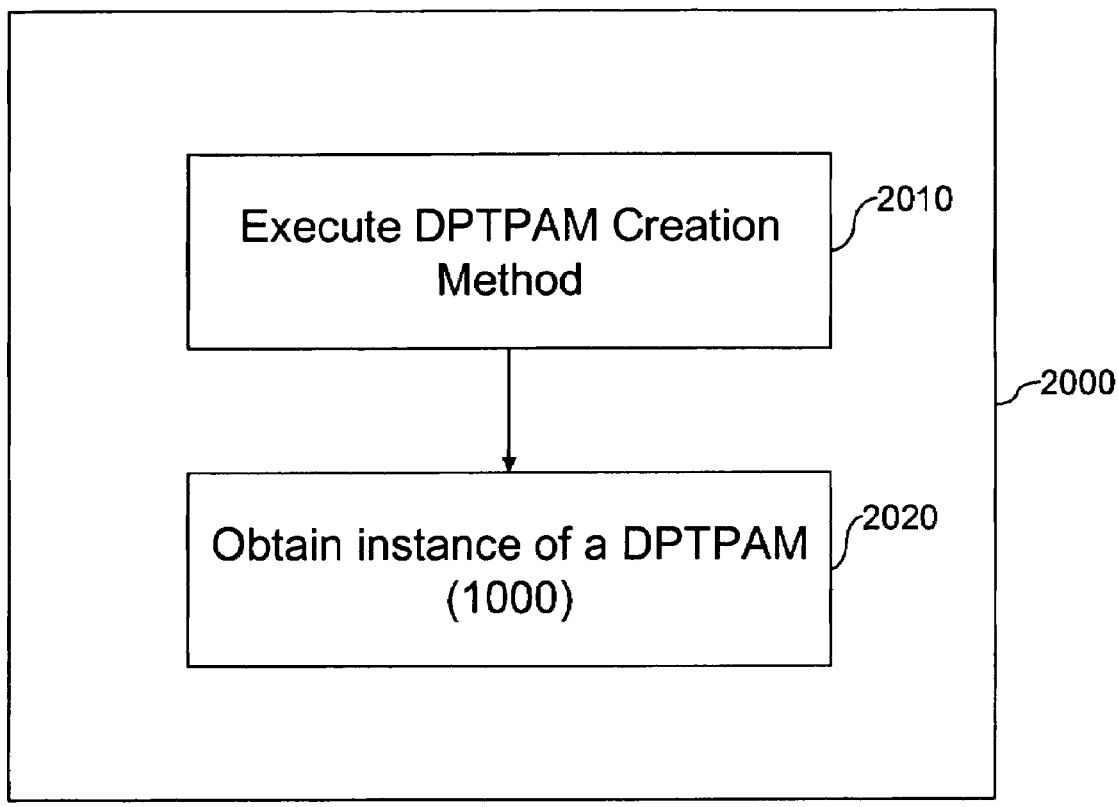
Fig. 2 – DPTPAM Creation Method Overview

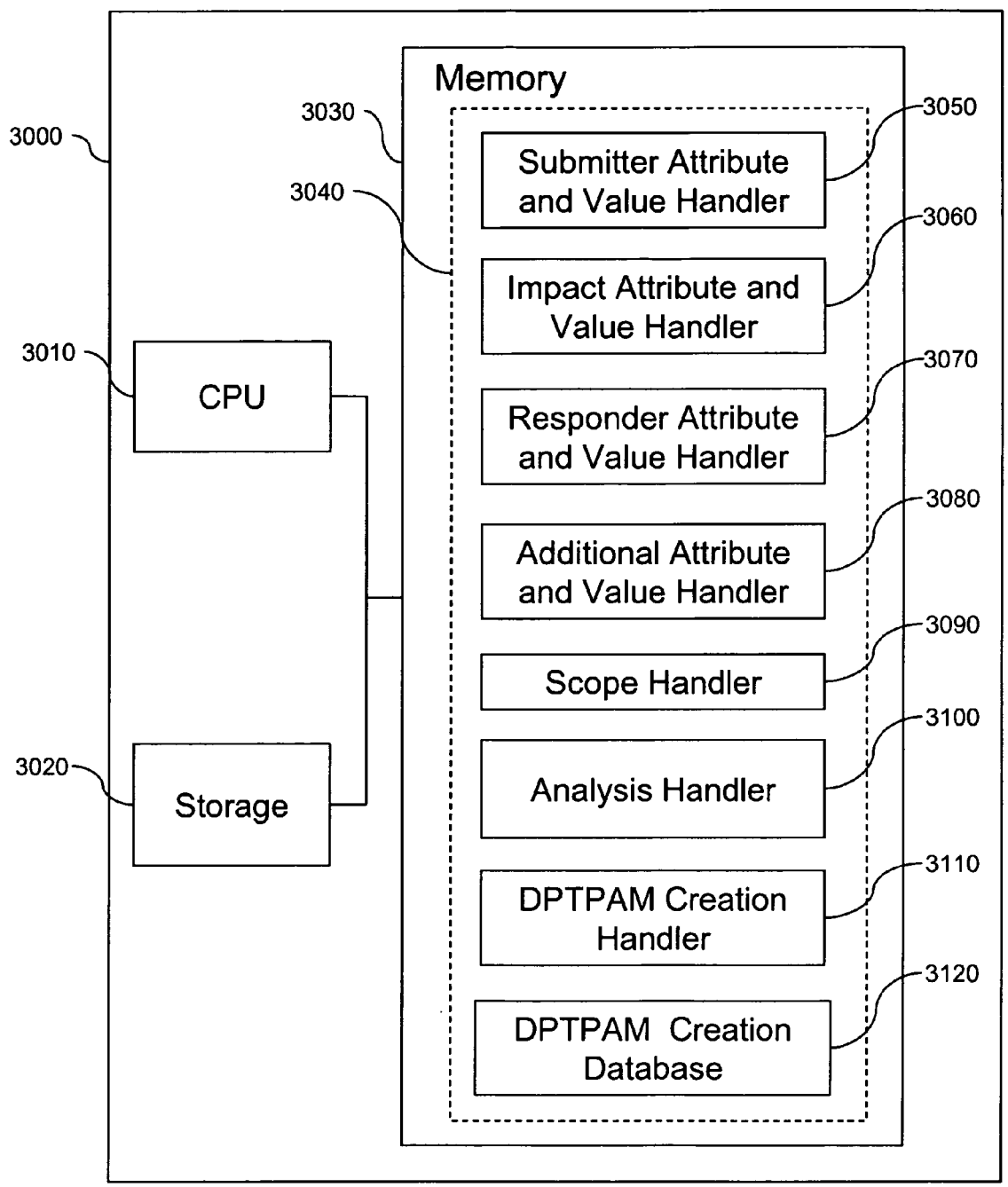
Fig. 3 – DPTPAM Creation Machine

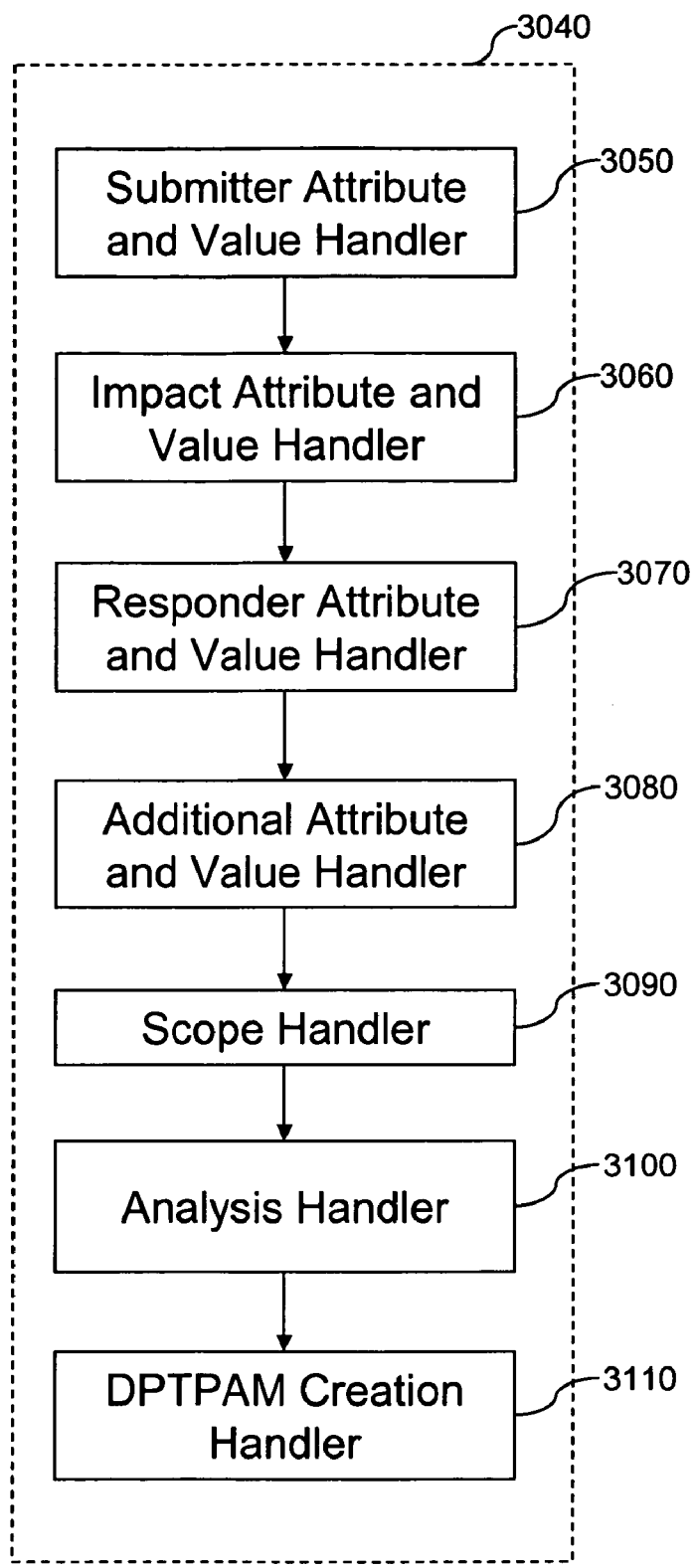
Fig. 4 – DPTPAM Creation Machine Logic

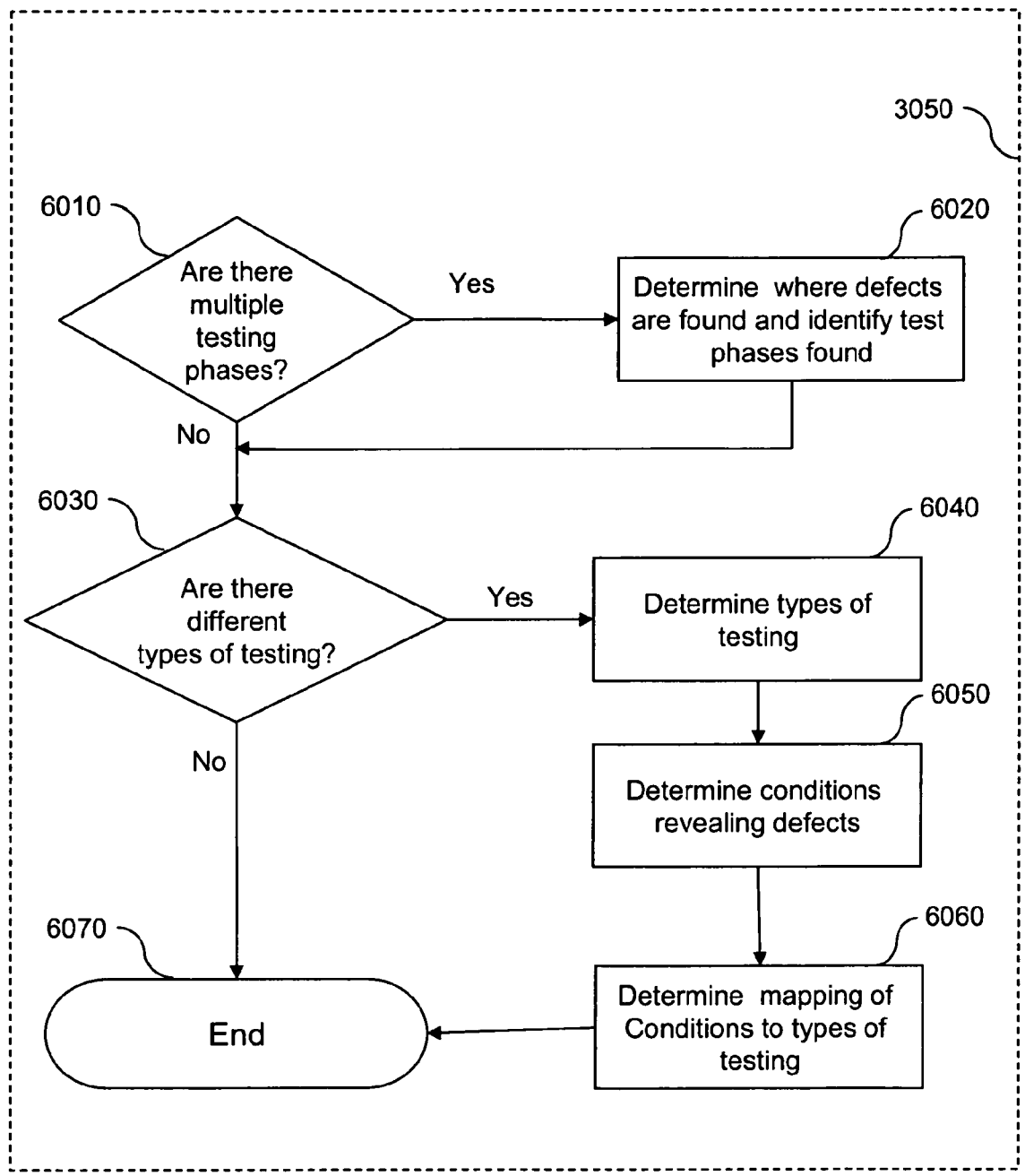
Fig. 5 – Logic Flow for Determining Submitter Attributes

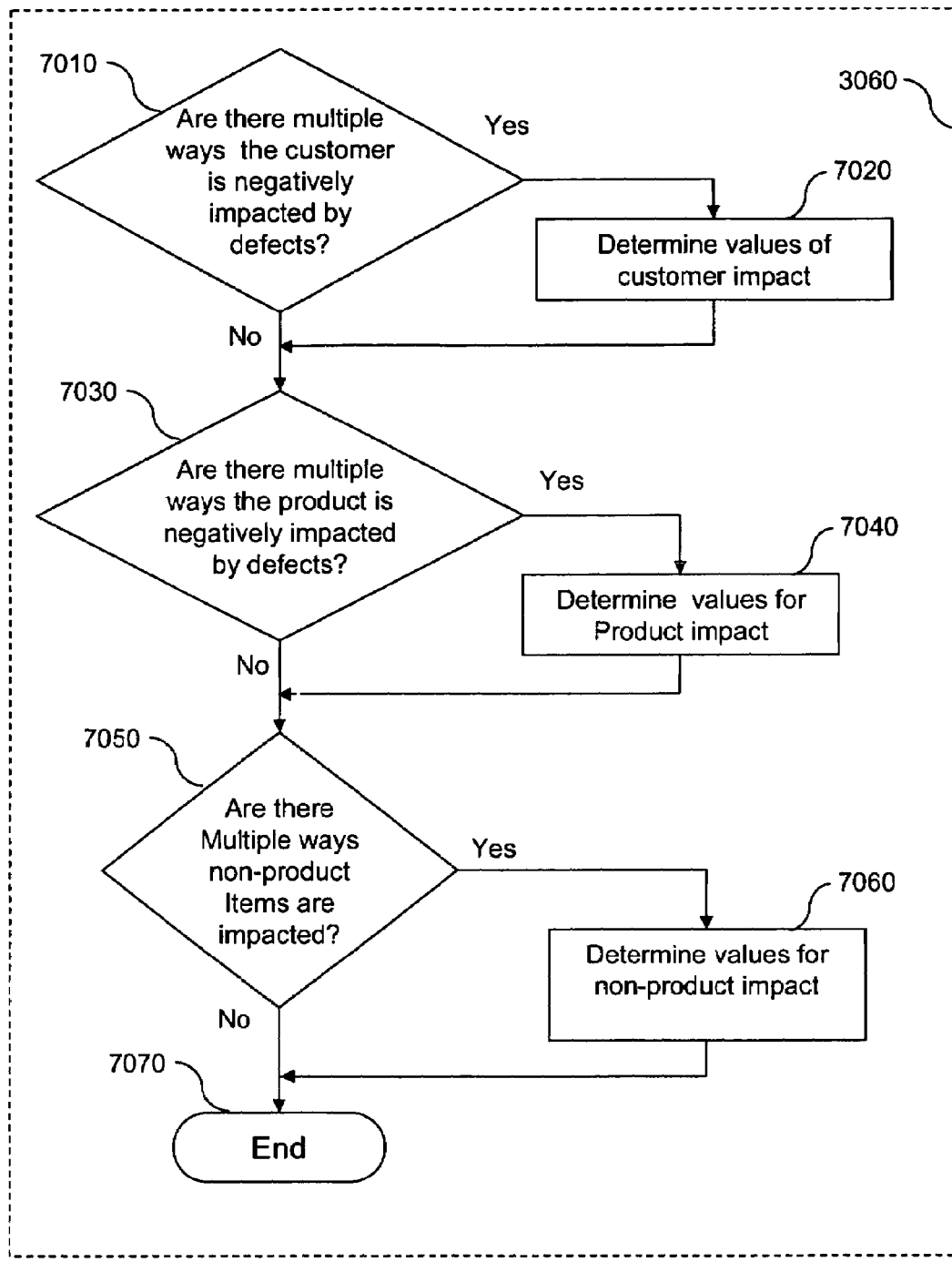
Fig. 6 – Logic Flow for Determining Impact Attributes

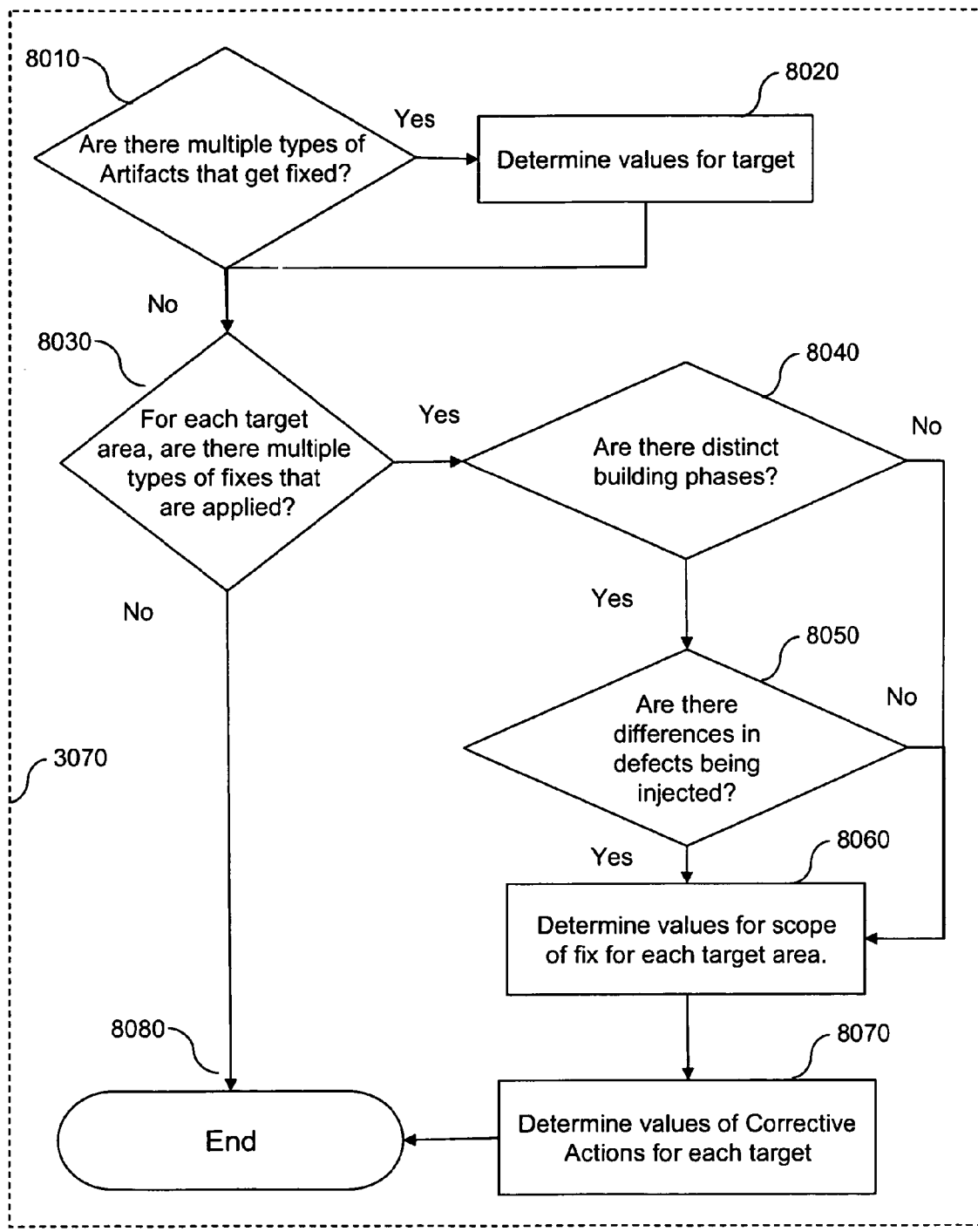
Fig. 7 – Logic Flow for Determining Responder Attributes

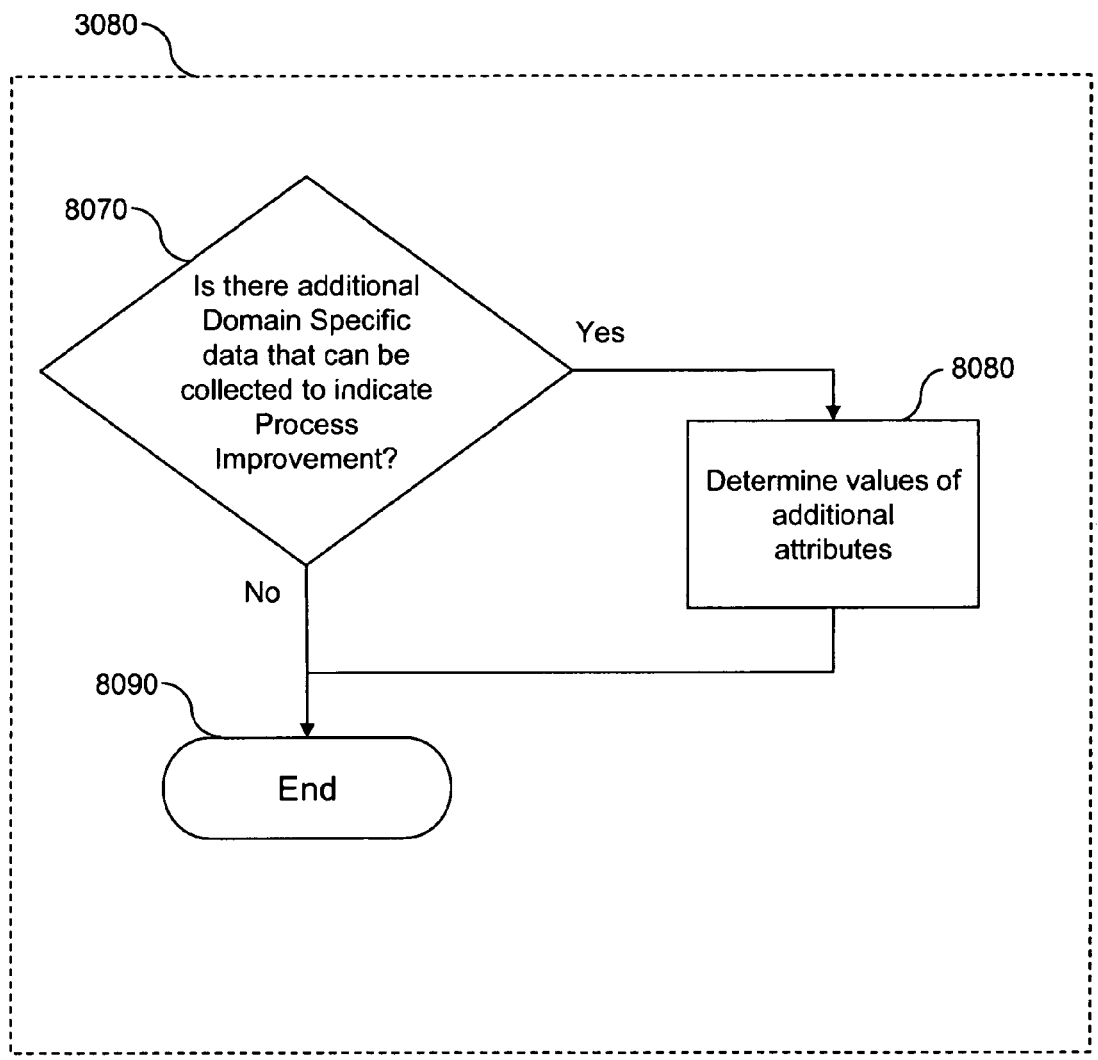
Fig. 8 – Logic Flow for Determining Additional Attributes

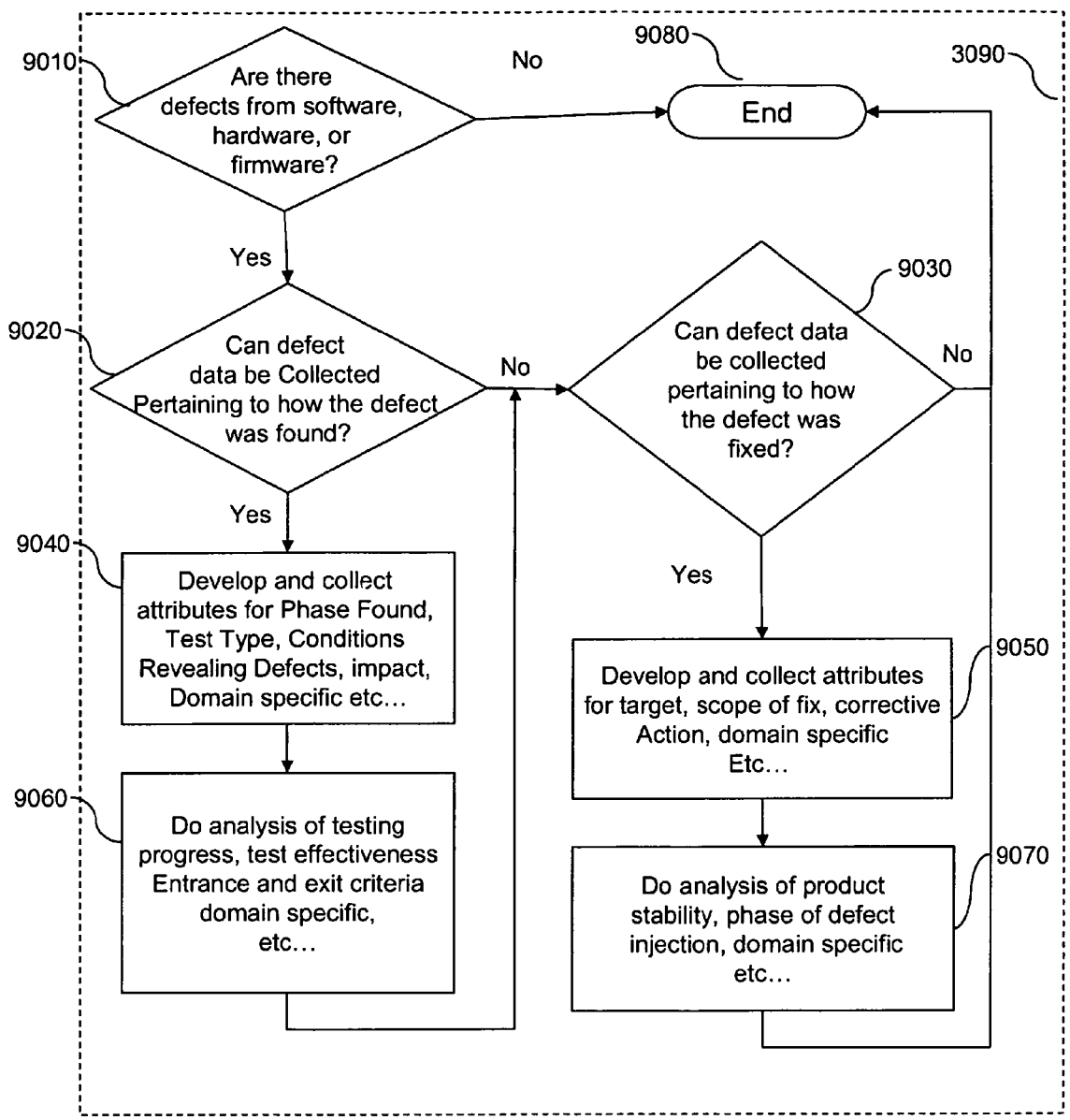
Fig. 9 – Logic Flow Diagram for Determining Scope of Analysis

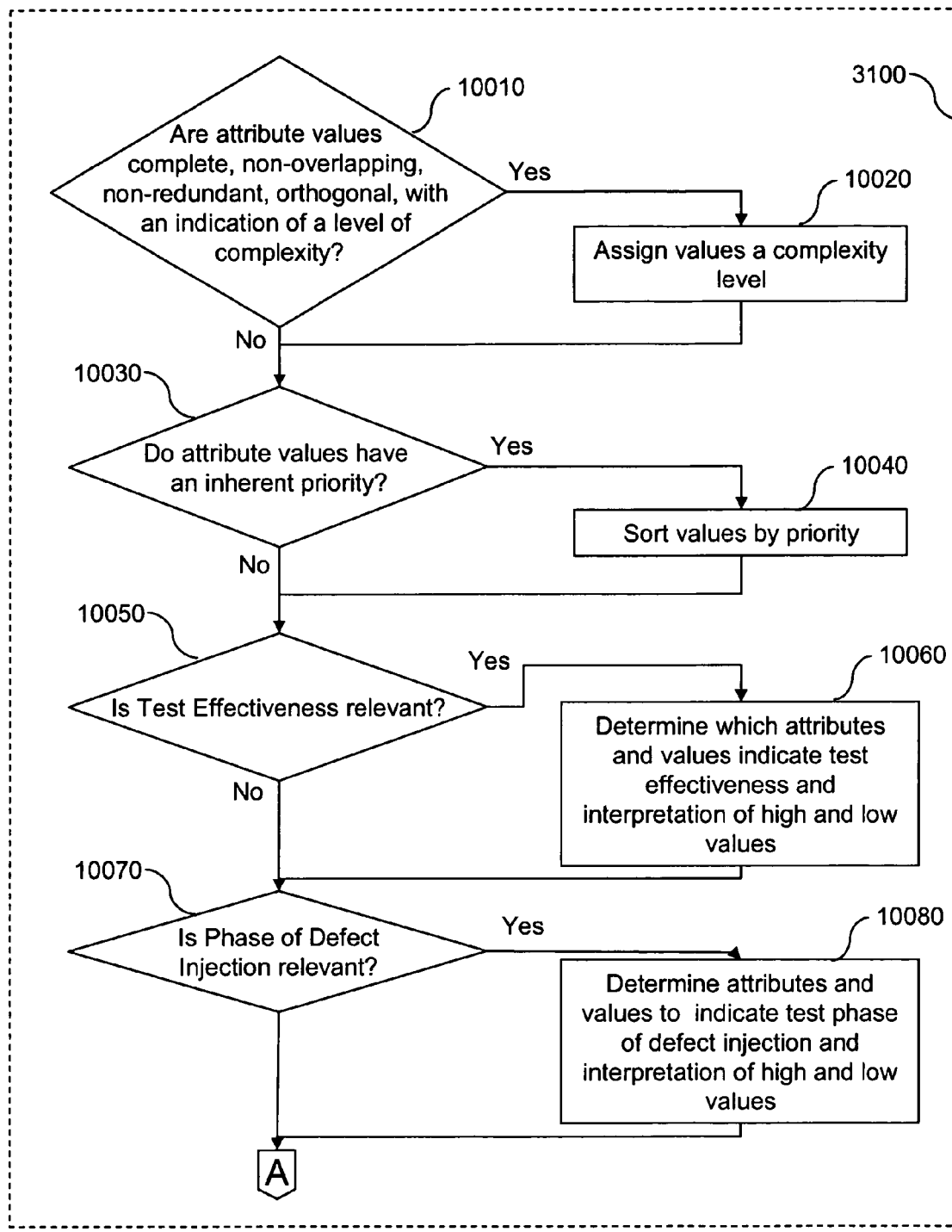
Fig. 10 – Logic Flow Diagram for Determining Analysis

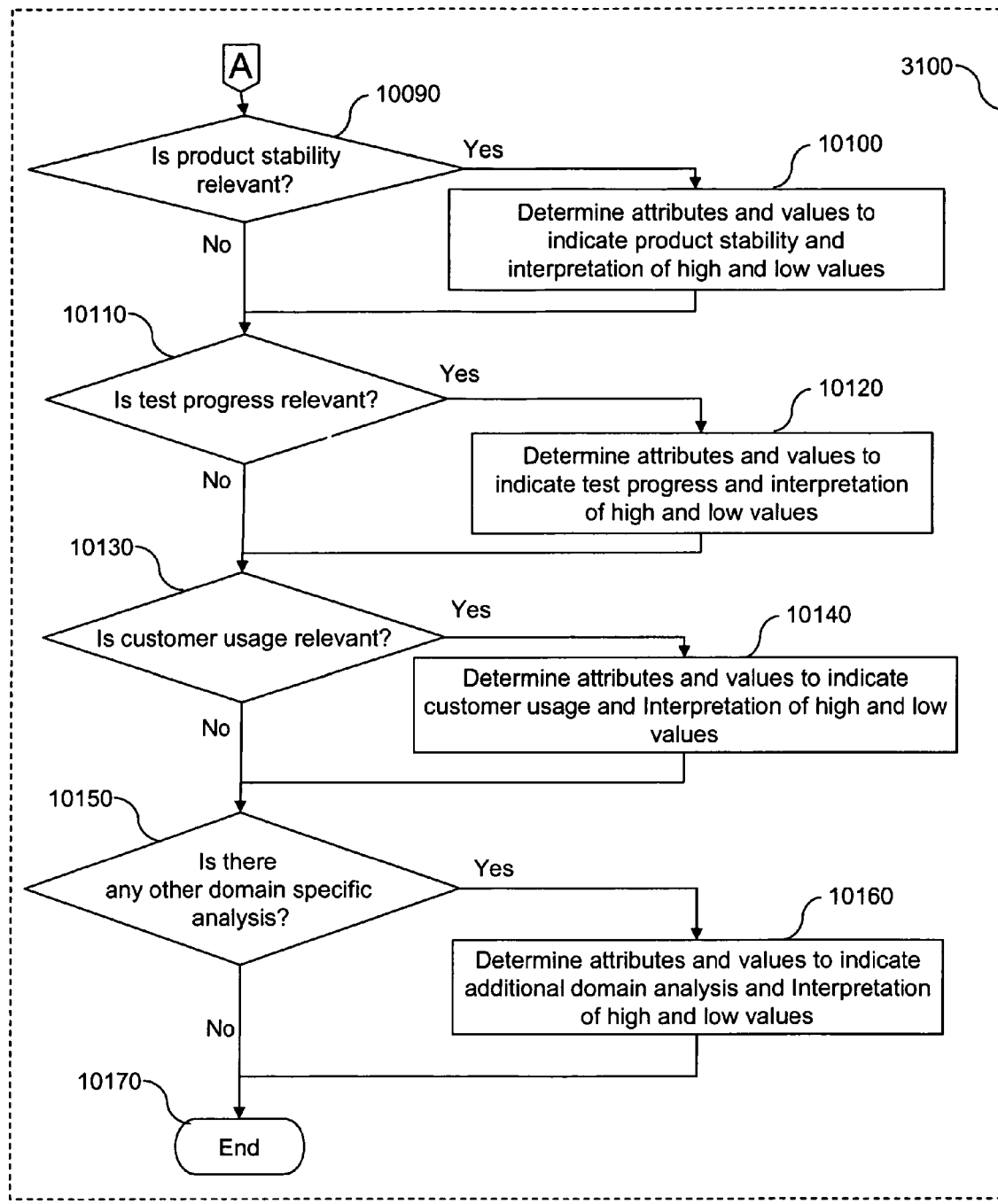
Fig. 10 Cont. – Logic Flow Diagram for Determining Analysis

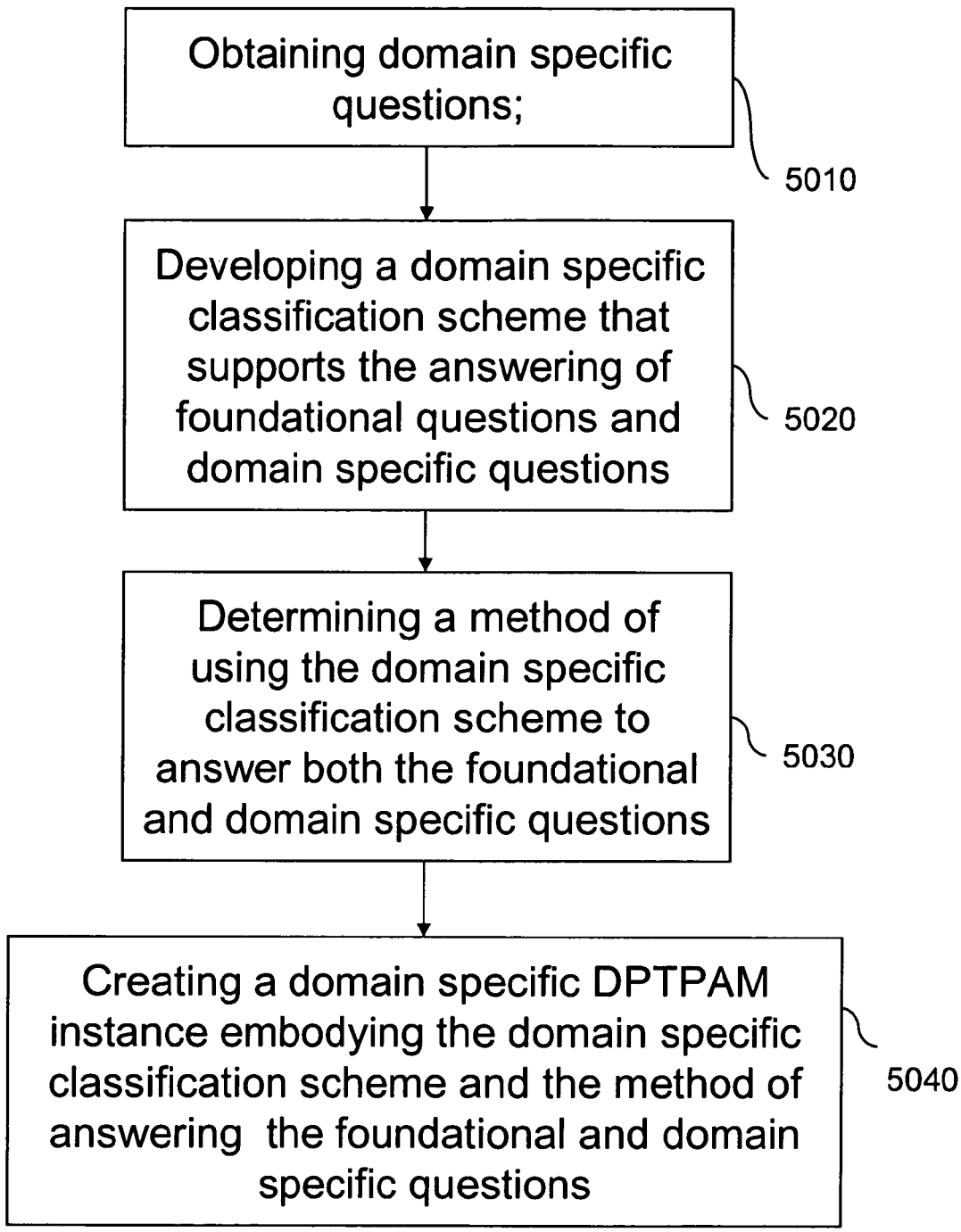
Fig. 11 – DPTPAM Creation Method Overview

METHOD AND SYSTEM TO DEVELOP A PROCESS IMPROVEMENT METHODOLOGY

CROSS-REFERENCE TO RELATED APPLICATIONS

This application is a continuation of U.S. application Ser. No. 11/397,034 filed Apr. 3, 2006.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information processing systems, and more particularly relates to the field of customizing a solution for process improvement based on defect analysis.

BACKGROUND OF THE INVENTION

Many defect-based process optimization techniques today are just binning schemes and do not link development and service. Patent application describes a method of providing production and test process analysis that uses defect data as an input, but this patent application does not describe how such methods are created for a given customer.

One can attempt to reverse engineer the Orthogonal Defect Classification (ODC) scheme from existing instances, but the resulting methodologies will not contain the right attributes and values to link the processes with the field defects. Further, no guide exists explaining how this reverse engineering should be done.

Thus, there remains a need for a method to develop a defect-based process improvement methodology.

SUMMARY OF THE INVENTION

Briefly, according to an embodiment of the present invention, a method to create an instance of a defect-based production and testing process analysis machine (DPTPAM) provides continual process improvement based on foundational questions and classified defect data. The method includes the following steps: obtaining domain specific questions; developing a domain specific classification scheme that supports the answering of the foundational and domain specific questions; determining a method of using the domain specific classification scheme to answer both the foundational and domain specific questions; and creating a domain specific DPTPAM instance embodying the domain specific classification scheme and the method of answering the foundational and domain specific questions. The method can be implemented with a machine and a computer readable medium comprising logic for performing the method.

The foregoing and other objects, aspects, features, and advantages of the invention will become more apparent from the following description and from the claims.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 1 is an illustrative block diagram of the technology that would execute as a result of execution of the creation method.

FIG. 2 is an illustrative diagram of the creation method execution.

FIG. 3 is an illustrative block diagram of the creation server according to one embodiment of the invention.

FIG. 4 is an illustrative logic diagram of the flow of the creation method.

FIG. 5 is an illustrative logic diagram for determining the submitter attributes.

FIG. 6 is an illustrative logic diagram for determining the impact attributes.

FIG. 7 is an illustrative logic diagram for determining the responder attributes.

FIG. 8 is an illustrative logic diagram for determining the additional attributes FIG. 9 is an illustrative logic diagram for determining the scope of the analysis FIG. 10 is an illustrative logic diagram for determining the analysis FIG. 11 is an illustrative block diagram of a creation method.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

The following definitions will be used henceforth:

1) "Establishment of relationships and rules"—In determining analysis, we need to identify the attributes from the domain specific classification scheme that will be used. For example, if we want to evaluate test effectiveness, we might look at the following classified data for defects: phase found vs. type of test, type of test vs. conditions revealing defects, type of test vs. corrective actions. One way we might look at this data is through bar charts. The first chart would have phase found on the x axis and type of test on the y-axis. We then need to identify what high and low values mean—is a high value good or bad and what does it indicates for process improvement.

2) "In house" refers to finding defects by the development team at their development location, before the product is released to the customer. Customer or field defects refer to finding defects by the customer.

3) "Trending information" refers to looking for trends in the data over time. We usually use open or closed date of the defects to look at this kind of information.

4) "Domain specific classification scheme" refers to the set of attributes, each with own set own set of applicable values, used by the customer to classify the defects found in the products they produce, and whose classified data is used by the analysis rules to produce an analysis report.

5) "Foundational analysis" refers to analysis we will try to do for any industry or customer, and which the domain specific classification scheme must support. This includes:

a. Evaluating test efficiency/effectiveness (i.e., how well it manages to catch defects that would have otherwise escaped);

b. Evaluating product stability (i.e., how reliability, dependability, consistency);

c. Evaluating testing progress (i.e., how well each phase catches its assigned the types of errors, e.g., parts testing catching all part defects);

d. Determining phase (point) of defect injection (i.e., determining which production step produced which defects).

e. Evaluating strengths & weaknesses of process and service;

(The first three are about removing defects; fourth is about preventing defects; fifth is about both.)

6) "Defect injection" refers to those phases that create defects in the product. This can be done during the requirements phase if we don't quite understand the customer's expectations, during the design phase, or during actual build of the product—through coding or assembly.

7) "Testing" refers to attempts to remove defects from the product. Many industries have multiple phases where they focus on defect removal.

We now discuss an embodiment of the invention wherein a method provides a way to customize a solution for process improvement based on defect analysis. This method creates a methodology for an industry whose goal is continual process improvement. The methodology includes creation of a domain specific classification scheme as well as a technique for doing analysis of classified data. The defect data may include in process hardware or software defects, as well as field, service and warranty claims.

The embodiment described with reference to FIGS. 1-11 describes how the current embodiment is used to provide a machine 3000 that produces instances of a Defect-Based Production and Testing Process Analysis Machine, DPTPAM 1000. First, a DPTPAM will be described, following which the creation method and associated machine 3000 will be described.

FIG. 1 is an illustrative flow control diagram of an instance of the technology 1000 that is produced as a result of an execution of a method according to an embodiment of the invention, to create a Defect-Based Production and Testing Process Analysis Machine (DPTPAM). Given such a DPTPAM instance 1000, a customer is able to improve their development and testing process in the following manner. In step 1010 defects are obtained resulting from testing or from users of the product. Then, in step 1020, the defects are classified according to the domain specific classification scheme created by the current embodiment 3000 (see FIG. 3). This could involve the customer's responding to a series of prompts for each defect, the prompts having the customer specify a value for each of the scheme's attributes. The defects are then analyzed 1030 according to the analysis determined by the creation machine 3000. This could involve the DPTPAM 1000 creating charts for one or more of the scheme attributes. It might also involve determining if the classified defect contains patterns that match the analysis criteria, any matches being noted. Finally, an analysis report is generated in step 1040 that addresses the salient points of process improvement. This report can include the charts generated in step 1030, as well as indications of the pattern matches found. For example, if the associated pattern is found, the generated report would point out that the customer's product is not yet ready for release. This type of machine is described in YOR9-2005-0481.

Thus, a DPTPAM includes of the attributes and values that make up the domain specific classification scheme, as well as the associated analysis necessary to determine how to improve the processes. Once the DPTPAM instance has been created, the user will use its classification scheme to classify their attributes. Only one value for each of the attributes will be selected for classification. They will then use the resultant analysis to evaluate their development and testing process and identify actions for improvement.

Skilled artisans will appreciate that although a DPTPAM could be embodied as an actual machine, e.g., a software application, the current invention also covers cases where the DPTPAM is embodied as a set of instructions to be carried out manually. These instructions would guide a given user through these steps 1010-1040.

FIG. 2 is an illustrative diagram an execution current invention. As shown, first the creation method is executed 2010. This results in the creation of a new DPTPAM instance 2020. Thus, the current invention is a (virtual) machine that is able to create a (virtual) machine—specifically a DPTPAM.

FIG. 3 depicts a block diagram of the computing system 3000 used in the example embodiment that provides the current invention. This server 3000 may comprise any computing node that is able to load and execute programmatic code, including, but not limited to: products sold by IBM such as ThinkPad® or PowerPC®, running the operating system and server application suite sold by Microsoft, e.g., Windows® NT, or a Linux operating system. According to the present invention, the server logic 3040 is preferably embodied as computer executable code that is loaded from a remote source (e.g., from a network file system), local permanent optical (CD-ROM), magnetic storage (such as disk), or Storage 3020 into memory 3030 for execution by CPU 3010. As will be discussed in greater detail below, the memory 3030 preferably includes computer readable instructions, data structures, program modules and application interfaces forming the following components: a Submitter Attribute and Value Handler 3050; an Impact Attribute and Value Handler 3060, a Responder Attribute and Value Handler 3070, an Additional Attribute and Value Handler 3080, a Scope Handler 3090, an Analysis Handler 3100, DPTPAM Creation Handler 3110, and a DPTPAM Creation Database 3120.

One of the outputs of a DPTPAM Creation Machine 3000 is a domain specific classification scheme, a set of attributes, each with an associated set of possible values, these attributes pertaining to defects of the product produced by the given customer. Under each of these attributes, appropriate values are identified. For each of the attributes and values identified by the DPTPAM Creation Machine 3000, there are certain rules that must be followed to optimize the knowledge obtained from the attributes and values. First and foremost, the attributes and values representing the data collected must contribute to our knowledge about process improvement. If it does not, there is no sense in collecting it. In addition, for attributes, the data obtained must be orthogonal—non-redundant, non-overlapping, and mutually exclusive. That means any new attribute identified must first provide new data that has not been identified by the DPTPAM Creation Machine 3000. We don't want to include data that is already captured elsewhere in the scheme. In order to identify values under each of these attributes, there are also rules that must be followed. The values should be orthogonal also, non-overlapping and mutually exclusive. In addition the set of values for any attribute should be complete—that is, they should cover the entire range of data that could be collected for that attribute. In some cases, the values cannot be orthogonal. In this case, it would then be important to assign a severity or priority for each of the values, indicating which values should be selected first, should there be 2 equally correct possibilities.

The Submitter Attribute and Value Handler 3050, which is will be described further with reference to FIG. 5, is responsible for determining the attributes and values related to the creation of defects. Typically, in an instance created by a DPTPAM Creation Machine 3000, this information would be captured when a defect is opened by a design engineer or tester and attempts to obtain information regarding how the defect was found. This could include identifying attributes such as "test phase that found the defect", "type of test activity that uncovered the defect", or "environment or condition that revealed the defect", etc. . . . Under each of these attributes, appropriate values would then be identified, following the rules stated above. The submitter attributes are important in analysis for evaluating test effectiveness. This can be done whether defects are found before or after release of a product. When using defects found before release, the submitter attributes are also used to measure progress. Therefore, the DPTPAM Creation Machine 3000 must identify attributes and values that support this analysis, which we call the foundational analysis.

The Impact Attribute and Value Handler 3060, which is will be described further with reference to FIG. 6, is responsible for determining the effect or impact of the defect. If the defect was found before release of the product, the impact pertains to the possible impact of the defect if it had been found after release of the product. If the defect was found after release of the product, then the impact refers to the actual effect of the defect. Impact may refer to the impact on the customer, the impact on the product, or the impact on a non-product such as property. For example, if the brakes fail on a car, their may be several attributes or categories of impact. The failure may result in injury to a customer, injury to the product itself, and possibly injury to property if the car caused damage to a building. In this case, we would then identify 3 different attributes for impact: customer, product, and non-product. We would then have to define all the possible values for each of those attributes following the rules stated above. For impact to a customer the DPTPAM Creation Machine 3000 might identify values of "death", injury", and "inconvenience." Note that in this case, the values might not be orthogonal. A customer could experience injury and death. So they are not mutually exclusive. In this case, it would be important to assign a severity or priority to each value, then. For example, "death" would have the highest severity, followed by injury. Inconvenience would be assigned the lowest severity. During analysis, the impact attribute can be used to measure test effectiveness and product stability, as well as analysis specific to the domain. Therefore, when identifying attributes and values, these pieces of the foundational analysis must be supported.

The Responder Attribute and Value Handler 3070, which is will be described in detail with reference to FIG. 7, is responsible for determining the attributes and values that would be known when the defect is fixed or resolved. During analysis this information is used to determine where defects are being injected into the requirements, design, or building of the product. Analysis is also used to evaluate product stability and determine strengths and weaknesses of the process. Identified attributes may include "target"—the area that was fixed in response to the defect, scope of fix—what was the nature and scope of the fix, corrective action—what action was taken to fix the defect. For scope of fix, it is important to obtain values that indicate not only what the nature of the fix was, but also, the scope of the fix. For example, was a crack in the door handle simply repaired, or was the whole transmission replaced? This is important information for determining where the defects are being injected, a part of the analysis.

The Additional Attribute and Value Handler 3080, which is will be described in detail with reference to FIG. 8, is responsible for determining any additional attributes and values specific to the domain (e.g., auto industry, healthcare, etc. . . . ) that will contribute to process improvement of the said industry. These may serve to strengthen the foundational analysis or they may identify a completely new area of analysis related to process improvement. For example, in the auto industry, it was determined that we needed to capture an additional attribute called "number of units affected," in order to correctly analyze "place of defect injection." Other DPTPAM instances 1000, only used "scope of defect fix" and "corrective action" to determine "place of defect injection."

The Scope Handler 3090, which is will be described in detail with reference to FIG. 9, determines the scope and type of attributes and values that can be created as well as the analysis that can be done. This will be dependent on the industry for which the DPTPAM Creation Machine 3000 is creating an instance. It will also be dependent on the type of data that is available and the data that the customer is willing to collect in addition to any data that they may already collect. This data could include: information on the manufacturing and testing process, defect data, Information on how the defects are fixed, and product information, such as cost, age of product.

The Scope Handler 3090 also determines which pieces of the foundational analysis can be performed. For example, if the customer is willing to collect in house defect data pertaining to the test phase found, the type of testing that uncovered the defect, and the conditions that revealed the defect, then evaluating test effectiveness and measuring progress can be performed.

Jointly, the Submitter Attribute and Value Handler 3050, the Impact Attribute and Value Handler 3060, the Responder Attribute and Value Handler 3070, the Additional Attribute and Value Handler 3080, and the Scope Handler 3090 create a given DPTPAM instance's domain specific classification scheme.

The Analysis Handler 3100, which is will be described in detail with reference to FIG. 10, is responsible for creating the mapping of attributes and values of the domain specific classification scheme to analysis. It ensures that analysis rules are followed as well as sorting values into appropriate order to enable analysis.

The DPTPAM Creation Handler 3110 is responsible for the creation of the associated DPTPAM instance 1000, i.e., one that used the domain specific classification scheme built by the Submitter Attribute and Value Handler 3050, the Impact Attribute and Value Handler 3060, the Responder Attribute and Value Handler 3070, the Additional Attribute and Value Handler 3080, and that uses the analysis determine by the Scope Handler 3090 and Analysis Handler 3100. This creation includes: creation of code (or instructions) that guide a given customer through the classification of their defects using the attributes and value scheme determined—i.e., the DPTPAM instance's step 1020, creation of code (or instructions) that analyze the classified defect data using the of the rules that link the classified defects to the analysis questions and answers, i.e., the DPTPAM instance's 1000 in step 1030, and creation of code (or instructions) that produces an analysis report form, i.e., DPTPAM instance's step 1040.

The DPTPAM Creation Database 3120 is responsible for storing the attributes, values, and queries that are created for the classification scheme and analysis. The DPTPAM Creation Database 3120 can be implemented using database tools such as the DB/2 product sold by IBM, and like database platforms.

FIG. 4 depicts the control flow of the DPTPAM Creation Machine's 3000 logic 3040. As shown, first the Submitter Attribute and Value Handler 3050 is executed to determine the attributes and values related to the creation of defects. Next, the Impact Attribute and Value Handler 3060 is executed which determines the effect or impact of given defects. Next, the Responder Attribute and Value Handler 3070 is executed, which determines the attributes and values that would be known when a given defect is fixed or resolved. Following this, Additional Attribute and Value Handler 3080 is executed, which determines any additional attributes and values specific to a given the domain (e.g., auto industry, healthcare, etc. . . . ) that will contribute to process improvement of the given domain. Next, the Scope Handler 3090 is executed, which determines the scope and type of attributes and values that can be created as well as the analysis that can be done. Following this, the Analysis Handler 3100 is executed, which creates the mapping between the attributes and values and the analysis. Finally, the DPTPAM Creation Handler 3110 is executed, which created a DPTPAM instance 1000 associated with the gathered attributes, values and relationships.

FIG. 5 depicts a logic diagram for determining submitter attributes 3050. Submitter attributes are those that are filled in when a defect is first opened. The submitter attributes are determined through answers to specific questions. The first question 6010 is "Are there multiple testing phases that are used to uncover defects?" Testing phases refer to calendar or scheduled phases in a development process that uncover defects. If there are, then the names of these values will make up the values for Test Phase Found 6020. The next question 6030 to ask is "Are there different types of testing that uncover defects?" If so, then the answer to this question will make up the values for types of testing 6040. Type of testing might include values like feature testing and system testing. Once you have determined the types of testing, then you must identify the conditions revealing defects 6050. The values for conditions revealing defects reflect specific types of test cases or specific types of environmental conditions that expose defects. For example, conditions could be environmental testing, or stress testing. They break the types of tests into more granular levels. These conditions should still adhere to the rules set up previously such that the conditions are a complete set of orthogonal values that help teams determine ways to improve their testing process. Once the conditions have been determined they must be assigned a category of test type 6060 so for any specific type of test, there is a limited set of choices for condition revealing defects. Once the conditions have been mapped, the flow ends 6070.

FIG. 6 depicts a logic diagram for determining impact attributes 3060. In this diagram, questions are asked to determine the impact of the defects on customers that encounter them, on the product itself, and on any other entity, such as property. The first question 7010 asked is "Are there multiple ways the customer is impacted by defects?" If so, then the values will determine the customer impact 7020. Possible impact would include performance, capability, reliability, security etc. . . . Next the question 7030 that must be answered is "Are there multiple ways the product can be negatively affected by defects?" If the answer to this question is yes, then the values 7040 for product impact can be determined. Values for product impact may include Fire, Theft, Product Inoperable, Function Inoperable, Safety Impairment, etc. . . . In this case, a priority scheme is used to sort the values with the highest priority item. When the instance 1000 of the Creation Scheme is created, the user will classify this attribute starting at the highest priority item. For example, if the defect resulted in fire of the product, then "fire" will be selected for the value of Product Impact, because it is at the top of the list of values and has the highest severity or priority. Finally, the question is asked "Are there non-product or personal impacts resulting from defects?" 7050. If yes, these values will determine the values for personal impact 7060, such as Death, Personal Injury, Environmental Damage, etc. . . . Once these values are determined, the program ends 7070.

FIG. 7 is a logic flow diagram for determining responder attributes 3070. Responder attributes are those that are classified when the defect is fixed or closed. The first question 8010 that needs to be answered is "Are there multiple types of artifacts that get fixed when a defect is corrected?" If yes, then these different types became the values 8020 for "Target". Here we are looking for high level areas that need to be fixed in response to a defect being resolved. For example, when a defect is found in an automobile, you could fix the product itself (the car), or you could fix documentation related to the product, or you could fix the transportation process, if many defects are introduced during that process. So, in this case, the target values would be the product, documentation, and transportation process. The next set of questions is used to determine the scope or nature of the fix. Each target value will have its own set of values for scope of fix. First, "Are there multiple types of fixes that are applied?" 8030. If so, then we know there will be multiple values for scope or nature of fix. The next 2 questions are important in identifying values for scope of fix that will allow us to analysis pertaining to where in the development and testing process the defects are being injected. "Are there distinct building phases?" 8040. These could include a requirements phase, design phase, building phase. These do not include test phases but are phase that function to build a product. These values will be the ones to be considered for where the defects are being injected. The next question 8050 is "Are there differences in defects being injected in these phases? That means, can we distinguish defects injected during the requirements phase vs. defects injected during the design phase vs. defects injected during the coding, or prototype building phase? If yes, we will identify metrics that allow us to determine which phase the defect was injected. Once these questions have been answered, we determine the values for scope of fix for each target area. This is one of the more difficult areas as we must keep in mind the answers to all the preceding questions. In addition to the rules mentioned for all scheme values, we also need values that a) capture complexity of fix from simple to more complex. For example, in a car, you may fix a simple part, a subsystem or a system. b) Along with other metrics, can indicate which phases the defects were injected. Finally, values for corrective action must also be determined 8070. That means for any defect scope of fix, what are all the possible values that could be used for correcting the problem. In the case of the automotive industry, values included "Replace", "Adjust", "Install-New", and "Reassemble". These values will also be used in analysis to indicate stability of the product. Once these values have been determined, the responder attributes are complete 8080.

FIG. 8 is a logic diagram 3080 for determining any additional attributes for either the submitter portion or the responder portion that are needed to provide analysis. "Is there any additional domain specific data that can be collected to support or enhance analysis and indicate process improvement?" 8070. If yes, then that data will be used to determine attributes and values for the additional data 8080. For example, in the automotive industry, two additional attributes identified were 1) Service Context and 2) # of Units Affected. Service Context includes values of "recall", "routine maintenance", and "unplanned maintenance". These values will be important to see how many defects were related to recall, routine or unplanned maintenance and will indicate areas to focus on for improvement. For # of units affected, it was determined that this number is needed to determine whether defects were injected during the requirements, design, or prototyping phase. Once additional attributes have been identified and values created, then this task is complete 8090.

FIG. 9 is a logic diagram for determining the scope of analysis 3090. This will indicate the type of defect analysis can be performed based on the limitations of the data so will indicate the focus when developing analysis rules and relationships for the data. The first question asked 9010 is whether defects are from software, hardware, or firmware. If defects are not from any of these areas, we need go no further 9080 because this invention creates a scheme for complex systems containing hardware or firmware and optionally software defects. If it is determined that this invention can be employed, then the next question to answer is "Can defect data be collected pertaining to how the defect was found?" 9020. This could include data from in house development or test team or from the customer. But if there are details available about how and when the defect was first found, then metrics can be identified that relate to phase found, types of testing, etc. . . . 9040. Once these metrics are identified, then analysis can be formed to address test effectiveness and any domain specific analysis related to how the defect was found. In addition, if defect data is available from in house testing phases, analysis rules and relationships can be established pertaining to entrance and exit criteria for testing phases and activities and measuring progress throughout testing phases and activities.

The next question is "Can defect data be collected pertaining to how the defect was fixed?" 9030. If the answer is yes, then we determine the attributes and values for target, scope of fix, corrective action, and any other domain specific attributes needed 9050. Once we have these attributes, we can establish relationships and rules for analysis pertaining to product stability, phase of defect injection, etc. . . . 9070. After these questions are answered, the metrics and analysis for responder are complete 9080.

FIG. 10 is a logic diagram for determining analysis 3100. The attributes and values mentioned below are those from the domain specific classification scheme. The first question asked 10010 is "Are attribute values complete, non-overlapping, non-redundant, and orthogonal, with an indication of a level of complexity?" If the answer is yes, a level of complexity is assigned 10020. Usually there are 4 levels with one being the least complex. The complexity is important in analysis as it helps to measure progress during development and pinpoints where improvements should be made. In general, you want to see a trend from executing the less complex to the more complex. For "revealing conditions" attribute, for example, you want to see that defects have been executed though less complex conditions first, and then c the more complex. One weakness that is often present is that development teams find defects through the simplex "revealing conditions" but never move on to the more complex, allowing the more complex defects to escape to the field and be found by customers. The next question 10030 is to ask "Do attribute values have an inherent priority? Usually, if they are not orthogonal and they do not have an inherent value of complexity, then they do need to have a priority 10040 assigned and the values need to be sorted by priority. For example, the attribute "Personal Impact" does not have a level of complexity and is not orthogonal. Instead, the values are sorted by priority, the value with the highest priority being at the top. The value "Death" comes first, followed by "Personal Injury", etc. . . . Once these questions are answered, then it is determined which of the foundational analysis concepts can be supported with the data. The next question 10050 is "Is Test Effectiveness relevant?" If data is available, on the how the defect was found such as condition revealing defect, type of test, and test phase found for defects found in house, then we can evaluate test effectiveness during analysis. That means we have to determine which attributes 10060 will be used to evaluate test effectiveness. We also need to determine what high and low values mean when looking at aggregate data and interpret any trends. For example, if there are very high levels of the lower complexity "Conditions Revealing Defects, and low levels of the high complexity conditions, we need to determine if this indicates high test effectiveness or low. This will determine the interpretation of the results obtained for the analysis. Next, the question 10070 is asked "Is Phase of Defect Injection relevant?" If there are multiple building phases where defects can be injected into the product and we defined metrics for scope of fix and corrective action, as well as other domain specific attributes, then we need to determine exactly which attributes and values will be used in this piece of analysis. We also need to determine what the high and low values mean as well as any trending information. The next question 10090 is "Is product stability is relevant?"_One important criterion for developing this type of analysis is that we have dates of when defects were found and fixed so that we can do trending analysis. We want to see if the product is becoming more or less stable over time. Of course, we need other attributes as well, like severity of defect, whether the corrective action was simply to replace a part of install a new one. Therefore, if product stability is relevant, we will determine the relationships 10100 of the attributes and values and interpret the trends as well as the high and low values. Next, we ask 10110 if test progress is relevant. Here we also need data for trending—either test phase found, or open date, for example. If test progress can be done, we determine the relationships 10120 of attributes and values and interpretation of high and low values as well as any trending information. Then we can move on to asking 10130 "If customer usage relevant?" In this case, we need to have defects reported by customers, rather than defects found by the development team in house. If we have that information and attributes that will address customer usage, then we can 10140 determine the relationship of those attributes and values as well as determining the meaning of high and low values. Also for customer usage, we will need dates for trending data. The final question asked 10150 is "Is there any other domain analysis that should be considered to address customer concerns?" If previous analysis has not addressed all customer concerns, then this is a place where we still have an opportunity to do that. Here 10160 we will need to determine which of the additional attributes and values can be used to address customer concerns and interpret the high and low values. Once this has been done, the development and interpretation of the analysis is complete 100170.

FIG. 11 is a block diagram illustrating an overview of the Defect-Based Production and Testing Process Analysis Method (DPTPAM) Creation Method. First, the domain specific classification scheme is developed in step 5010, by obtaining domain specific questions, e.g. through executions of the Submitter Attribute and Value Handler 3050, the Impact Attribute and Value Handler 3060, the Responder Attribute and Value Handler 3070, the Additional Attribute and Value Handler 3080, and the Scope Handler 3090 respectively. Next, step 5020 develops a domain specific classification scheme that supports the answering of the foundational and domain specific questions, e.g., via executing steps 10150 and 10160 of the Analysis Handler 3100. Next, step 5030 determines a method of using the domain specific classification scheme to answer both the foundational and domain specific questions, e.g., by executing the Analysis Handler 3100. Note that this analysis could include the determination the relationships of attributes, the interpretation of high and low values, as well as any available trending information. Finally, step 5040 creates a domain specific DPTPAM instance, embodying the domain specific classification scheme and the method of answering the foundational and domain specific questions, for the customer, e.g., by executing the DPTPAM Creation Handler 3110.

A skilled artisan will appreciate that a given service organization could use the current invention to provide DPTPAM-related services for a first user. These DPTPAM-related services comprise: the service organization creating all or part of a DPTPAM instance for the first user; the service organization updating all or part of the first user's DPTPAM instance; the service organization validating (e.g., checking the correctness and completeness) all or part of the first user's DPTPAM instance; the service organization analyzing of all or part of the first user's DPTPAM instance; the service organization teaching the first user to create all or part of a DPTPAM instance for themselves; the service organization teaching the first user to update all or part of a DPTPAM instance for themselves; the service organization teaching the first user to validate all or part of a DPTPAM instance for themselves; and the service organization teaching the first user to analyze all or part of a DPTPAM instance for themselves.

The invention claimed is:

1. A method to create an instance of a defect-based production and testing process analysis machine (DPTPAM), the method comprising steps of:
    obtaining domain specific questions, foundational questions, and classified defect data;
    developing a domain specific classification scheme that supports answering foundational and the domain specific questions;
    determining a method of using the domain specific classification scheme to answer both the foundational and domain specific questions for performing a foundational specific analysis; and
    creating a domain specific DPTPAM instance embodying the domain specific classification scheme and the method of answering the foundational and domain specific questions for providing continual process improvement based on the foundational questions and the classified defect data.

2. A machine for creating an instance of a defect-based production and testing process analysis machine (DPTPAM) for providing continual process improvement based on foundational questions and classified defect data, the machine comprising:
    a processor; and
    a memory, coupled to the processor, and storing logic for:
        obtaining domain specific questions;
        developing a domain specific classification scheme that supports the answering of the foundation and domain specific questions;
        determining a method of using the domain specific classification scheme to answer both the foundational and domain specific questions; and
        creating the domain specific DPTPAM instance embodying the domain specific classification scheme and the method of answering the foundational and domain specific questions.

3. A computer program product embodied on a computer readable storage medium comprising program code that, when executed, causes a computer to:
    obtain domain specific questions, foundational questions, and defect data;
    develop a domain specific classification scheme that supports the answering of foundational questions and the domain specific questions;
    determine a method of using the domain specific classification scheme to answer both the foundational and domain specific questions; and
    create a domain specific DPTPAM instance embodying the domain specific classification scheme and the method of answering the foundational and domain specific questions.

4. A method for a first user to use a method to create a DPTPAM instance for a second user, the method comprising steps of:
    obtaining domain specific questions;
    developing a domain specific classification scheme that supports the answering of foundational questions and the domain specific questions;
    determining a method of using the domain specific classification scheme to answer both the foundational and domain specific questions; and
    creating a domain specific DPTPAM instance embodying the domain specific classification scheme and the method of answering the foundational and domain specific questions.

* * * * *